United States Patent
Meixner

(10) Patent No.: US 6,811,914 B2
(45) Date of Patent: Nov. 2, 2004

(54) ELECTROCHEMICAL SOLID-STATE DEVICE COMPRISING B-SITE RICH LANTHANUM CALCIUM MANGANITE

(75) Inventor: Donald Laurence Meixner, Carmarillo, CA (US)

(73) Assignee: Air Products and Chemicals, Inc., Allentown, PA (US)

( * ) Notice: Subject to any disclaimer, the term of this patent is extended or adjusted under 35 U.S.C. 154(b) by 115 days.

(21) Appl. No.: 09/844,568

(22) Filed: Apr. 27, 2001

(65) Prior Publication Data

US 2003/0022048 A1 Jan. 30, 2003

(51) Int. Cl.⁷ .............................................. H01M 8/02
(52) U.S. Cl. ......................................... 429/34; 501/123
(58) Field of Search ................ 429/32, 34; 501/123

(56) References Cited

U.S. PATENT DOCUMENTS

| | | | |
|---|---|---|---|
| 4,885,142 A | 12/1989 | Suitor et al. | 423/219 |
| 5,186,806 A | 2/1993 | Clark et al. | 204/265 |
| 5,298,138 A | 3/1994 | Nachles et al. | 204/267 |
| 5,356,730 A | * 10/1994 | Minh et al. | 429/32 |
| 5,750,279 A | 5/1998 | Carolan et al. | 429/32 |
| 5,868,918 A | 2/1999 | Adler et al. | 205/615 |
| 6,228,520 B1 | * 5/2001 | Chiao | 429/32 |
| 6,228,522 B1 | 5/2001 | Batavia et al. | 429/34 |

FOREIGN PATENT DOCUMENTS

| | | | |
|---|---|---|---|
| EP | 0682379 | 3/1999 | H01M/8/24 |
| EP | 0974564 | 1/2000 | C04B/35/01 |
| EP | 0983786 | 3/2000 | B01D/53/52 |
| EP | 1081778 | 3/2001 | H01M/4/86 |
| JP | 7187768 | 7/1995 | C04B/35/42 |
| JP | 7-320757 | * 8/1995 | H01M/8/02 |
| JP | 7320757 | 12/1995 | H01M/8/02 |

* cited by examiner

Primary Examiner—Stephen J. Kalafut
(74) Attorney, Agent, or Firm—Keith D. Gourley

(57) ABSTRACT

The present invention relates to an interconnect for an electrically driven solid electrolyte oxygen separation device comprising a composition of matter represented by the general formula:

$$Ln_xCa_{x'}A_{x''}Mn_yB_{y'}O_{3-\delta}$$

wherein
Ln is selected from the group consisting of La, Ce, Pr, Nd, Pm, Sm, Eu, Gd, Tb, Dy, Ho, Er, Tm, Yb, and Lu; A is selected from the group consisting of Sr, Ba and Y; B is selected from the group consisting of Cu, Co, Cr, Fe, Ni, Zn, Nb, Zr, V, Ta, Ti, Al, Mg, and Ga; $0.1 \leq x \leq 0.9$; $0.1 \leq x' \leq 0.9$; $0 \leq x'' \leq 0.5$; $0.5 < y < 1.2$; and $0 \leq y' \leq 0.5$; provided that $x+x'+x''=1$ and $1.2 > y+y' > 1.0$ wherein $\delta$ is a number which renders the composition of matter charge neutral.

13 Claims, 5 Drawing Sheets

ELECTROCHEMICAL SOLID-STATE DEVICE COMPRISING B-SITE RICH LANTHANUM CALCIUM MANGANITE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Dense solid electrolyte membranes formed from certain classes of multicomponent metallic oxides transport oxygen ions at elevated temperatures upon application of an electric potential gradient across such dense membrane. These devices are referred to as electrically driven solid electrolyte oxygen separation devices. Dense solid electrolyte membranes, which do not possess connected through porosity, transport oxygen ions an upon application of an electrical potential gradient across the dense solid electrolyte membrane.

Each electrochemical cell comprises a dense solid electrolyte membrane formed from an oxygen ion conducting multicomponent metallic oxide, an anode and a cathode. Two or more of such electrochemical cells are connected in series by interconnects which are formed from electron conducting multicomponent metallic oxides. An interconnect is defined as an element which connects an anode and cathode of immediately adjacent electrochemical cells to establish an electrical connection in series between such adjacent electrochemical cells.

The above electrochemical cells can be constructed in tubular, flat plate and honeycomb configurations. The flat plate configuration is preferred for several reasons since it allows for multiplication by connecting several electrochemical cells comprising said solid electrolyte membranes in a stack. In such a stack, a plurality of electrochemical cells comprising the dense solid electrolyte membranes are combined (or stacked) to operate in electrical series. This in turn increases the efficiency of the device. The flat plate design is also favored for ease of assembly and compact dimensions.

The stack may optionally include a support member and anode and cathode seals. The stack of these electrochemical cells may be placed between an anode and a cathode connection on respective end plates and may be housed in a shell providing for manifolds, heating etc.

Representative structures are disclosed in U.S. Pat. Nos. 5,868,918, and 5,570,279, both assigned to Air Products and Chemicals, Inc., and U.S. Pat. Nos. 4,885,142; 5,186,806; 5,298,138 or European Patents Nos. 0 682 379 and 0 983 786.

The interconnects of these subject devices fulfill several roles. The interconnect (1) provides for separation of gas passages between anode and cathode sides of adjacent electrolyte plates, (2) provides the channels by which feed and product gas streams are manifolded, (3) acts as an electronic conductor to connect the solid electrochemical cells in series, (4) prevents back diffusion of oxygen from the product stream to the feed stream, and (5) in many cases due to the relative thickness of the components, the interconnect provides additional mechanical support to the stack.

Interconnects are formed from electrically conductive materials which have low oxygen ionic conductivity under operating conditions, typically an oxygen ion conductivity of less than $10^{-2}$ S/cm. Interconnects are formed from compositions which conduct electrons under operating conditions, and which have a low oxygen ion conductivity under operating conditions. Such interconnects must be sufficiently compatible with other device materials so that the interconnect should not adversely react with other components to form products which negatively impact device performance or lifetime. The interconnects should possess a coefficient of thermal expansion that matches other device materials, and have sufficient mechanical stability to withstand the prevailing pressure difference within each electrochemical cell. The interconnect material should be stable at the conditions prevailing at the anode and cathode side of the solid electrolyte membrane. The interconnect should be of sufficient strength to mechanically stabilize the stack.

Further, the interconnect material should be formed from a composition of matter which will not deform or distort upon either assembly or use of the device. When the above material demands are combined, the number of candidate materials for making the interconnects is severely limited.

Stoichiometric lanthanum strontium manganite represents a commonly used interconnect composition. U.S. Pat. No. 5,750,279 discloses a series planar design for solid electrolyte oxygen pumps. This patent lists a number of candidate stoichiometric compositions for interconnects including lanthanum strontium manganite, lanthanum strontium chromite, lanthanum calcium manganite, and lanthanum calcium chromite. (see also, U.S. Pat. No. 5,868,918).

The mechanical properties of stoichiometric lanthanum strontium manganite interconnects (LSM-interconnects) are not completely satisfactory. For example, sintered-interconnects formed from stoichiometric LSM may display room temperature deformation properties at moderate stress.

The prior art stoichiometric LSM-interconnects exhibit low values for dynamic Young's modulus and fracture strength. The presence of microcracking or other phenomena relating to low modulus, low strength, and interconnect deformability may limit the long term mechanical performance of the apparatus.

Those skilled in the art are searching for a mechanically stable and electronically conductive, and economically viable interconnect for use in electrically driven solid electrolyte oxygen separation devices.

BRIEF SUMMARY OF THE INVENTION

This object is solved and the above deficiencies and other disadvantages of the prior art are overcome by an interconnect for an electrically driven solid electrolyte oxygen separation device comprising a composition of matter represented by the general formula:

$$Ln_xCa_{x'}A_{x''}Mn_yB_{y'}O_{3-\delta}$$

wherein Ln is selected from the group consisting of La, Ce, Pr, Nd, Pm, Sm, Eu, Gd, Tb, Dy, Ho, Er, Tm, Yb, and Lu; A is selected from the group consisting of Sr, Ba, and Y; B is selected the group consisting of Cu, Co, Cr, Fe, Ni, Zn, Nb, Zr, V, Ta, Ti, Al, Mg, and Ga; $0.1 \leq x \leq 0.9$; $0.1 \leq x' \leq 0.9$; $0 \leq x'' \leq 0.5$; $0.5 < y \leq 1.2$; and $0 \leq y' \leq 0.5$; provided that $x+x'+x''=1$ and $1.2 > y+y' > 1.0$, wherein $\delta$ is a number which renders the composition of matter charge neutral.

Another embodiment of the present invention relates to an electrochemical device comprising such interconnect. More in detail, the invention relates to an electrochemical solid-state device comprising at least two electrochemical cells which are electrically connected in series by one or more interconnects wherein at least one interconnect comprises a composition of matter represented by the general formula:

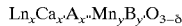
$$Ln_xCa_{x'}A_{x''}Mn_yB_{y'}O_{3-\delta}$$

wherein Ln, A, B, $\delta$, x, x', x", y, and y' are as defined above.

DETAILED DESCRIPTION OF THE INVENTION

Figure 1:
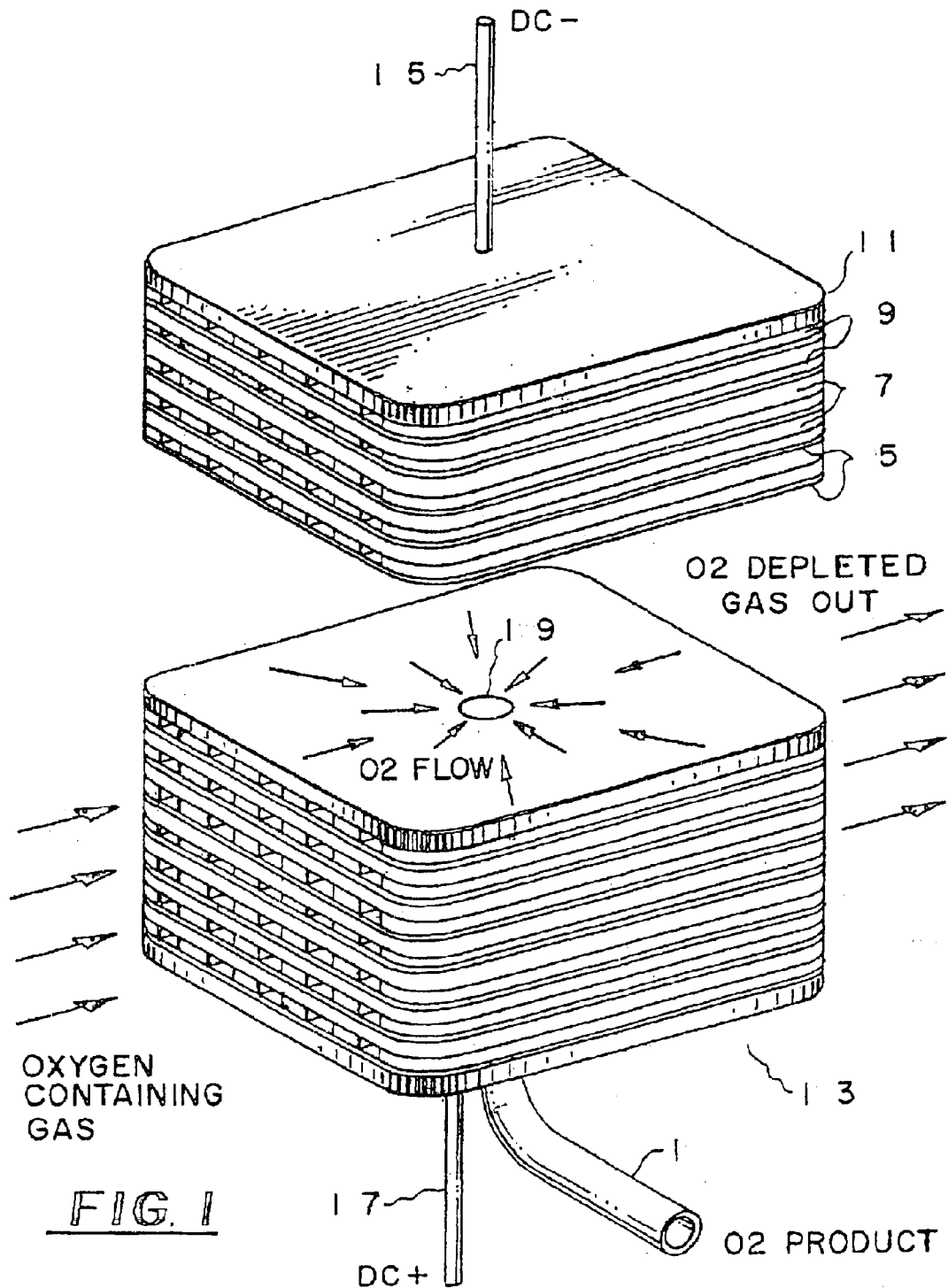
FIG. 1 is a schematic view of an embodiment of a device of the invention.

As set forth above, a first embodiment of the present invention relates to an interconnect for an electrically driven solid electrolyte oxygen separation device comprising a composition of matter represented by the general formula:

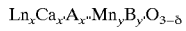
$$Ln_xCa_{x'}A_{x''}Mn_yB_{y'}O_{3-\delta}$$

wherein
Ln is selected from the group consisting of La, Ce, Pr, Nd, Pm, Sm, Eu, Gd, Tb, Dy, Ho, Er, Tm, Yb, and Lu, preferably Ln is La; A is selected from the group comprising of Sr, Ba, and Y, preferably A is Sr; B is selected the group consisting of Cu, Co, Cr, Fe, Ni, Zn, Nb, Zr, V, Ta, Ti, Al, Mg, and Ga; preferably B is Co; and wherein $0.1 \leq x \leq 0.9$; $0.1 \leq x' \leq 0.9$; $0 \leq x" \leq 0.5$; $0.5 < y < 1.2$; and $0 \leq y' \leq 0.5$; provided that $x+x'+x"=1$ and; and wherein $\delta$ is a number which renders the composition of matter charge neutral.

The term "B-site rich" refers to compositions wherein the sum of the coefficients x, x' and x" equal one and wherein the sum of the coefficients y and y' is greater than one. The compositions according to the present interconnects utilize a specific range of B-site rich materials wherein $1.2 > y+y' > 1.0$.

Preferably x and x' are in the ranges of $0.3 \leq x \leq 0.7$ and $0.3 \leq x' \leq 0.7$, respectively, even more preferably $0.3 \leq x \leq 0.5$ and $0.5 \leq x' \leq 0.7$. Preferably x" is in the range $0 \leq x" \leq 0.2$, even more preferably x"=0. Preferably y and y' are in the ranges $0.9 < y \leq 1.2$ and $0 \leq y' \leq 0.1$, respectively, even more preferably y' is 0. The sum of y and y' is preferably in the range of $1.05 > y+y' > 1.02$.

In a more preferred embodiment in the above general formula Ln is La, A is Sr, B is Co, $0.3 \leq x \leq 0.5$; $0.5 \leq x' \leq 0.7$; $0 \leq x" \leq 0.2$; $0.9 < y \leq 1.2$; and $0 \leq y' \leq 0.1$; provided that $x+x'+x"=1$ and $1.05 > y+y' > 1.02$.

According to another preferred embodiment the interconnect for an electrically driven solid electrolyte oxygen separation device comprises a composition of matter represented by the general formula:

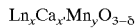
$$Ln_xCa_{x'}Mn_yO_{3-\delta}$$

wherein
Ln is selected from the group consisting of La, Ce, Pr, Nd, Pm, Sm, Eu, Gd, Tb, Dy, Ho, Er, Tm, Yb, and Lu, preferably Ln is La; $0.1 \leq x \leq 0.9$; $0.1 \leq x' \leq 0.9$ and $1.0 < y \leq 1.2$; provided that $x+x'=1$; and wherein $\delta$ is a number which renders the composition of matter charge neutral.

The B-site rich lanthanum calcium manganite (LCM) compositions chosen for the interconnect according to the invention offer a number of advantages which make such B-site rich LCM compositions uniquely well suited to the demands of an interconnect, especially a flat plate interconnect. In particular, the B-site rich LCM composition of matter displays a significantly reduced sintering temperature compared with prior art stoichiometric lanthanum strontium manganite, lanthanum strontium chromite, and lanthanum calcium chromite. This lowered sintering temperature is an inherent feature of the material, enabling firing of the complex part in a single cycle. Such lower sintering temperatures may have a dramatic impact on the economics of the process of production for the entire stack, significantly reducing costs associated with production of such devices. The B-site rich LCM compositions of matter also display more favorable thermal expansion coefficients than the stoichiometric LSM compositions. Further, the B-site rich LCM compositions of matter of the present invention do not contain volatile chromium oxides, which represent a barrier to the practical use of any lanthanum chromite based material.

The compositions of matter of the invention further display dramatically improved mechanical properties compared to stoichiometric lanthanum strontium manganites (LSMs), including unexpected three-fold improvements in strength and modulus as well as an absence of the plastic deformation behaviour displayed by similarly processed LSMs. The consistent and excellent mechanical properties of the compositions of the present invention facilitate stack manufacture and are likely to improve long term performance and stability. Finally, the LCM compositions of matter used in the interconnect of the invention display improved stability in the oxygen containing, oxidizing environments on both the anode and cathode side, adequate electronic conductivity, sufficiently low ionic conductivity and materials compatibility with other stack compositions. Therefore, such compositions of the claimed interconnects are well suited for manufacture on a commercial scale.

The compositions of matter in general have perovskitic and preferably perovskite structure with the above lanthanide(s) and calcium being in the A-site and manganese being in the B-site. Perovskitic structures include true perovskites that have a three dimensional cubic array of small diameter metal ion octahedra, as well as structures that incorporate a perovskite-like layers or layer, i.e. a two dimensional array of small diameter metal ion octahedra arranged in a two dimensional square array. These perovskite-like arrays are charge stabilized by larger diameter metal ions, or other charged layers. Examples of perovskitic structures include cubic perovskites, brownmillerites, Aurivillius phases, and the like.

The interconnect is prepared by conventional ceramic techniques known in the art. Sintering temperatures and procedures should be selected such that the sintered interconnect is free of connected through porosity, i.e. having a network of pores which do not allow diffusion of gases there-through. The interconnect should have a final density of above 95% of theoretical density, preferably about 97% of theoretical density and more preferably of about 99% of theoretical density. Sintering temperatures of the interconnect of the invention are typically below 1350° C., preferably below 1300° C.

The interconnects of the present invention may be stackfired, hangfired, or fired by use of any other means to minimize interaction of the composition of matter or interconnect with a setter. Any suitable setter known in the art may be used. In any case it is desired to prevent sticking between the setter and the interconnect. Further, any reaction between the interconnect and the setter which results in warping or in general in deformation of the interconnect or its surface should be avoided. Preferably, sintering conditions and lack of interactions would allow reuse of setters in interconnect production.

The interconnect of the invention is as put forth above for use in an electrochemical device. The present invention therefore in its second aspect relates to an electrochemical solid-state device for electrically driven transport of oxygen ions through an electrolyte, said device comprising at least two electrochemical cells which are electrically connected in series wherein at least one interconnect comprises a composition of matter represented by the general formula:

$$Ln_xCa_{x'}A_{x''}Mn_yB_{y'}O_{3-\delta}$$

wherein
Ln is selected from the group consisting of La, Ce, Pr, Nd, Pm, Sm, Eu, Gd, Tb, Dy, Ho, Er, Tm, Yb, and Lu, preferably Ln is La; A is selected from the group consisting of Sr, Ba, and Y, preferably A is Sr; B is selected the group consisting of Cu, Co, Cr, Fe, Ni, Zn, Nb, Zr, V, Ta, Ti, Al, Mg, and Ga, preferably B is Co; and wherein $0.1 \leq x \leq 0.9$; $0.1 \leq x' \leq 0.9$; $0 \leq x'' \leq 0.5$; $0.5 < y \leq 1.2$; and $0 \leq y' \leq 0.5$; provided that $x+x'+x''=1$ and $1.2 > y+y' > 1.0$, and wherein $\delta$ is a number which renders the composition of matter charge neutral.

In a preferred embodiment Ln is La, A is Sr, B is Co, $0.3 \leq x \leq 0.5$; $0.5 \leq x' \leq 0.7$; $0 \leq x'' \leq 0.2$; $0.9 < y \leq 1.2$; and $0 \leq y' \leq 0.1$; provided that $x+x'+x''=1$ and $1.05 > y+y' > 1.02$.

According to another preferred embodiment the above interconnect(s) for the electrochemical solid-state devices for electrically driven transport of oxygen ions through an electrolyte may comprise a composition of matter represented by the general formula:

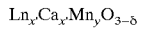

$$Ln_xCa_{x'}Mn_yO_{3-\delta}$$

wherein
Ln is selected from the group consisting of La, Ce, Pr, Nd, Pm, Sm, Eu, Gd, Tb, Dy, Ho, Er, Tm, Yb, and Lu, preferably Ln is La; $0.1 \leq x \leq 0.9$; $0.1 \leq x' \leq 0.9$; and $1.0 < y < 1.2$; provided that $x+x'=1$; and wherein $\delta$ is a number which renders the composition of matter charge neutral.

The above solid-state device for oxygen separation is preferably an electrically driven device employing an ionically conducting electrolyte material. More preferably, the interconnect is used in a stack forming part of a solid electrolyte oxygen separation device. An exemplary device is disclosed in U.S. Pat. No. 5,868,918, assigned to Air Products and Chemicals, Inc., which document is incorporated herein by reference. This document discloses a stack of the planar or flat plate design utilising alternating electrolyte plates and electrically conductive interconnects which define repeat units which operate in electrical series and isolate the feed and product gases from each other. The corresponding stack arrangement of interconnect and solid electrolyte is shown in the attached FIG. 1 (not to scale), for purpose of reference.

In this embodiment the electrolytes are planar and are stacked in the axial direction. The stack shape of each plate in radial direction from a central opening can be formed form a variety of shapes including circular, square, rectangular or any other planar geometrical shape as required by the specific application. The preferred electrolyte plate and interconnect are, generally square with rounded corners as shown in FIG. 1. Although this figure is not to scale, it can be seen that the solid electrolyte plates 5 are comparatively thin (about 250 μm) as compared to the interconnects 7 which interconnects 7 in general have a thickness about ten times the thickness of the solid electrolyte, or around 2500 μm.

The overall assembly and operation of an electrolyte stack is illustrated by the schematic isometric view of FIG. 1. The stack is formed by a series of alternating electrolyte plates 5 with appropriate anodes and cathodes (not shown), interconnects 7 and insulating support material 9, with negative end plate 11 and positive end plate 13. Positive and negative electrical connections 15 and 17 provide direct current to the stack, which operates at about 50 to 700 mV per cell.

Oxygen-containing feed gas flows into one side of the stack as shown, flows through the cathode sides of the cells in a cross flow mode, and the oxygen-depleted gas exits the opposite side of the stack. The insulating supports 9 on the opposite sides of the stack direct gas in a cross flow mode through formation of suitable barriers and passages. A section through the stack shows the radial flow of oxygen product gas across the anode side of an interconnect toward the central opening 19. The central openings through the electrolyte plates and interconnects, in conjunction with cathode seals, form a central conduit in gas flow communication with the anode side of each cell. The central conduit connects with oxygen withdrawal conduit 1 which in turn is connected with a gas-tight seal (not shown) to bottom or positive end plate 13. Alternatively, an oxygen withdrawal conduit (not shown) could be connected at negative end plate 11. If desired, oxygen product can be withdrawn from both ends of the stack (not shown).

The above electrochemical cell stack and the solid-state device can be fabricated by methods known in the art of ion conducting ceramics as described above. Besides the interconnect of the invention, the device can be made from any materials known in the art and generally used as solid electrolytes/membranes, electrodes, and seals.

Figure 2:
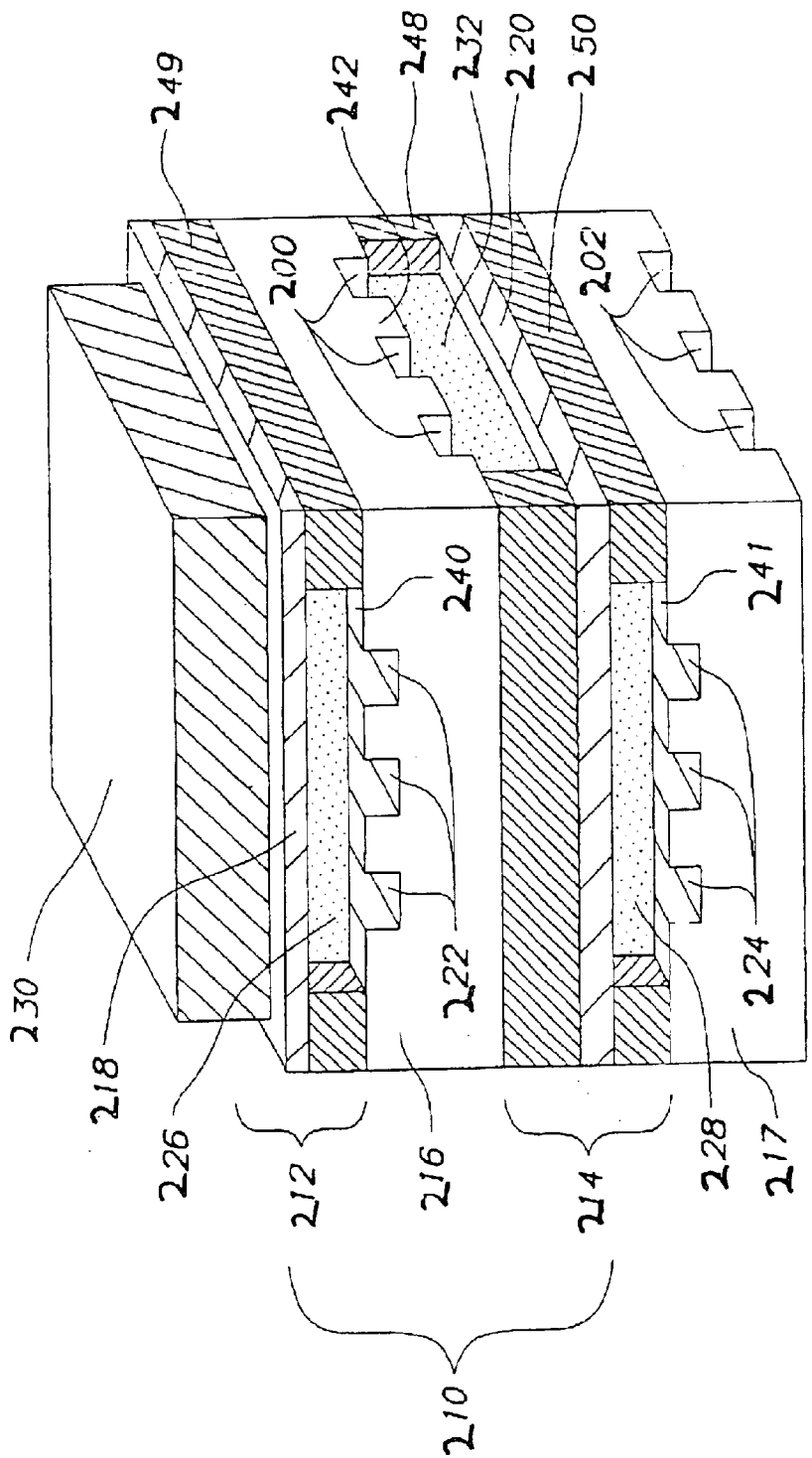
FIG. 2 is a schematic view of another embodiment of a device of the invention.

Another preferred embodiment of the solid-state device of the invention is illustrated in FIG. 2, based on the disclosure of U.S. Pat. No. 5,570,279 relating to flat plate designs of oxygen pumps in general. As shown in FIG. 2 this device 210 includes a plurality of electrochemical cells 212, 214 joined together by an electrically conducting interconnect 216 of the invention. A similar interconnect would likewise be used to join the cells shown to following cells or to form the terminus of the device via an end cap 230.

The electrolytic cells consist of solid electrolytes 218, 220 having a first and a second surface, said electrolytes being about 5 μm to 1 mm thick. The membranes may be formed from any suitable material known in the art.

Anode layers 226, 228 are formed on the first surface of the electrolytes of the cells and cathode layers 232 are formed on the second surface of the electrolyte of the cells. The anode layers and the cathode layers may be formed from any oxidation resistant material, an alloy or a multicomponent mixed conducting oxide as known in the art. Both layers are typically applied independently in form of a coating to the respective surface and can be attached e.g. by sintering of a paste applied by screen printing, sputtering, painting etc. The thickness of the electrodes is typically in the range of 0.1 to 100 μm.

As illustrated by FIG. 2 the first surface of the interconnect 216 is adjacent the anode layer 226 of cell 212. A conductive material 240, 241 such as silver or silver alloy or the material of the anode layer or interconnect, may optionally be formed between the anode 226 and the interconnect 216 and anode layer 228 and the interconnect 217. Similarly, the second surface (not shown) of the interconnect 216 is adjacent the cathode layer 232 of cell 214, and a conductive material 242 may optionally be formed between the interconnect 216 and the cathode layer 232. The conductive material 240, 242 serves to direct electrons from the anode layer 226 to the interconnect 216, and from the interconnect 216 to the cathode layer 232.

To effect a gas-tight seal between the cells 212, 214 and the interconnect 216, sealing means in the form of a sealant are positioned therebetween. That is, a sealant 248 of a suitable composition such as devitrifying glass or a suitable oxidation resistant metal braze alloy such as Ag/Pd is formed between the interconnect 216 and two opposite edges of the second surface of the electrolyte 220. Similar sealants 249, 250 are positioned between opposite edges of the first surface of the adjacent electrolytes 218, 220 and the interconnects 216, 217. In a preferred embodiment the sealant 248 on the second surface of interconnect 216 is positioned so that it is separated from the electron pathway of interconnect 216. Likewise, the sealant 250 on the first surface of the interconnect 217 is separated.

Gas passages 200, 202, 222 and 224 may be fabricated within the interconnect in a wide variety of shapes, in cross-section, such as rectangular, trapezoidal, semi-circular and the like. The depth and spacing of the passages may be widely varied and optimum designs may be assessed for a given application without undue experimentation. For example, the depth of a passage may decrease with distance traversed across the surface of the electrode layer in order to increase the diffusional flux to the electrode surface of the component gas being transported through the electrolyte.

The invention will be further illustrated by the following examples, which are given for illustration purposes only and are not intend to limit the scope of this invention.

EXAMPLE 1

Effect of Substituting Strontium for Calcium on A-Site

The compositions listed in Table 1 were prepared as described below for evidencing the effect of replacing calcium in lanthanum calcium manganites by strontium. The compositions were prepared from the corresponding oxides and carbonates as follows: $La_2O_3$ (PIDC 99.999%), $SrCO_3$ (Solvay SL300), $CaCO_3$ (GE 111-030-026), $Mn_3O_4$ (Chemetals PF), and $Co_3O_4$ (OMG/APEX LS). The respective oxides and carbonates were mixed in respective amounts to achieve the desired overall compositions and cation fractions.

The 100 gram charges of powder were vibratory milled in 125 ml polyethylene jars for 24 hours using high-purity Y-TZP balls at a media-to-charge ratio of 3.5. 40 grams of anhydrous methanol was used for each formulation. The dried powders were screened to −80 mesh and calcined on high-purity (99.8%) alumina plates at 1150° C. for 10 hours, with 100° C./hr ramps up and down. The calcined powders were lightly sintered. The calcined powders were vibratory milled an additional 72 hours using the same jars and same media as before, with 35 grams methanol added to each container. A small slurry sample (~10 grams) was extracted from each jar and submitted for surface area and other characterization. The remaining slurries were lubricated with ~3 wt % XUS binder with 10–20 grams of added methanol by paint shaking the slurry in the original containers for 30 minutes. The powders were then stir-dried and screened to −60 mesh. The dried powders were pressed uniaxially at approximately 100 MPa (4 metric tons over 0.24"×2.4" area).

The green bars were fractured into two pieces each, and pieces representing each composition were then sintered on a single setter using the following schedule: 20→500° C. at 26° C./hr (18 hr ramp); 500→$T_{peak}$ at 100° C./hr; 4 hr hold at $T_{peak}$; $T_{peak}$→900° C. at 300° C./hr, furnace off; where $T_{peak}$ represents the peak temperature selected for a given sintering run. Sintering runs were performed using peak temperatures of $T_{peak}$=1100, 1150, 1200, 1250, 1300, 1350, and 1400° C., respectively.

Densities and open porosities were measured using Archimedes' method in water, with boiling induced by the vacuum method. Theoretical densities were calculated based on the best fit to experimental x-ray diffraction patterns indexed to an orthogonally distorted perovskite structure. Densities were calculated as a percent of theoretical. "Green" refers to the sample after pressing but before any firing has taken place.

Each of the compositions in Table 1 was formulated at a Lanthanum/Alkaline Earth ratio of 4:6. Each of the compositions in Table 1 was formulated to be 2% B-site rich.

TABLE 1

| Sample | Composition | Alkaline Earth Content |
|---|---|---|
| A | $La_{0.400}Ca_{0.600}Mn_{1.02}O_{3-\delta}$ | Lanthanum Calcium Manganite (LCM): 100% of alkaline earth = Ca |
| C | $La_{0.400}Sr_{0.030}Ca_{0.570}Mn_{1.02}O_{3-\delta}$ | LCM with 5% Ca replaced by Sr |
| D | $La_{0.400}Sr_{0.150}Ca_{0.450}Mn_{1.02}O_{3-\delta}$ | LCM with 25% Ca replaced by Sr |
| E | $La_{0.400}Sr_{0.300}Ca_{0.300}Mn_{1.02}O_{3-\delta}$ | LCM with 50% Ca replaced by Sr |
| F | $La_{0.400}Sr_{0.450}Ca_{0.150}Mn_{1.02}O_{3-\delta}$ | LCM with 75% Ca replaced by Sr |
| G | $La_{0.400}Sr_{0.600}Mn_{1.02}O_{3-\delta}$ | Lanthanum Strontium Manganite (LSM) 100% of alkaline earth = Sr |

Figure 3:
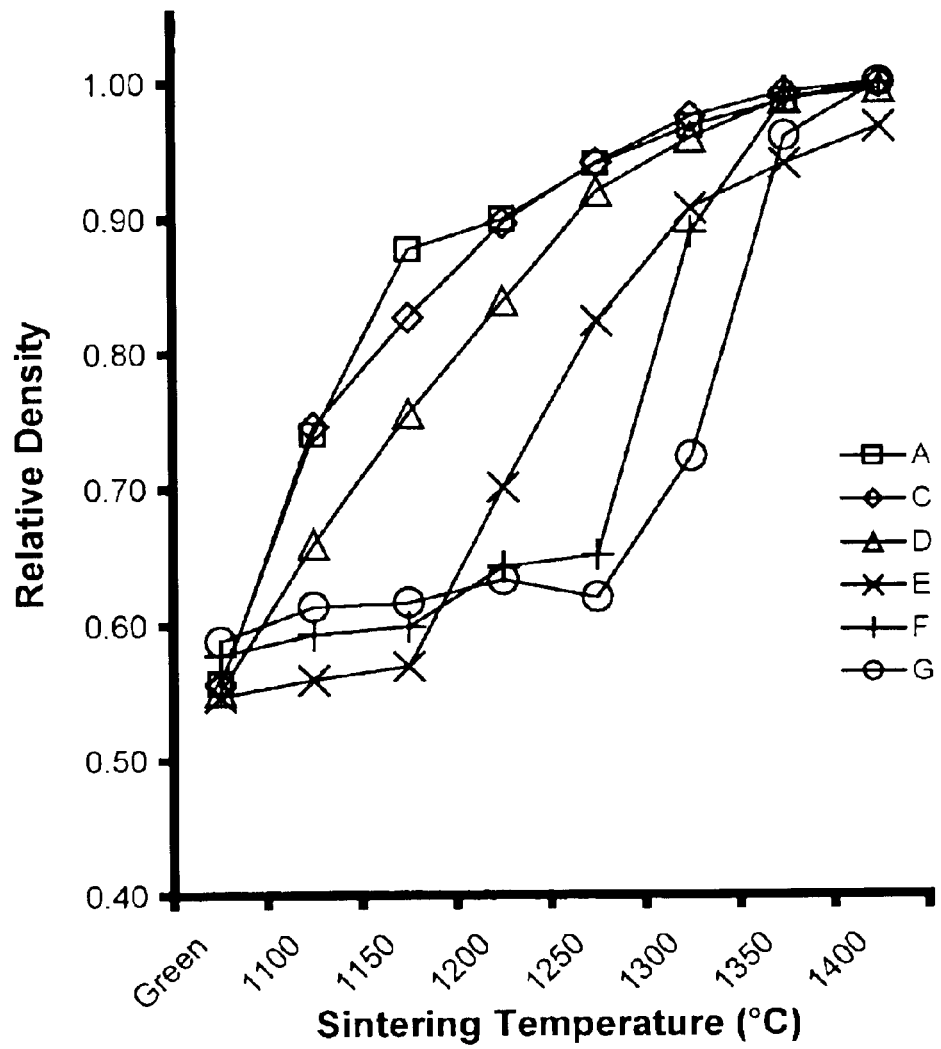
FIG. 3 is a graph showing density of interconnect compositions versus sintering temperature, illustrating the effect of substituting strontium for calcium on the A-site.

FIG. 3 shows the density as a fraction of theoretical density for the compositions shown in Table 1. It is desirable for an interconnect that the density approaches 100% of theoretical at the lowest possible sintering temperature. As shown in FIG. 3, samples A (pure LCM composition) and C (LCM with 5% Ca replaced by Sr) achieved the highest densities at the lowest temperatures. In terms of densification, the next most sinterable sample was D (LCM with 25% Ca replaced by Sr), followed by, in order, samples E (LCM with 50% Ca replaced by Sr), F (LCM with 75% Ca replaced by Sr), and G (LSM). Therefore, the sintering characteristics of the LCM-based composition became poorer as more of the Ca was replaced by Sr, with the worst sintering properties displayed by the composition in which Ca was entirely replaced by Sr.

From the data in FIG. 3, LCM provides a sintering advantage of at least 100° C., meaning that LCM sinters to an equivalent extent at temperatures at least 100° C. lower than the analogous LSM composition. The improved sinterability of the LCM-based materials of this invention provides an exceptional improvement in interconnect production. In particular, the reduced sintering temperature enables these materials to be sintered without adverse consequences to the desired shape due to reaction with the setter (the material on which the part is placed during sintering). This enables the interconnect to be processed in a single firing step, without need for additional downstream processing or grinding to achieve the desired degree of flatness. An additional significant advantage is that such lowered temperatures allow for reducing volatile contamination and stress on sintering equipments such as furnaces and setters.

EXAMPLE 2

Effect of A-Site to B-Site Cation Ratio

The compositions listed in Table 2 were prepared for evidencing the effect of the overall A:B site cation molar ratio. The compositions were prepared in exactly the same manner as described in Example 1. Each of the compositions in Table 2 was formulated as a pure LCM composition (i.e. no Sr was present on the A-site). Each sample employed a Lanthanum/Calcium ratio of 4:6.

TABLE 2

| Sample | Composition | Stoichiometry |
| --- | --- | --- |
| A | $La_{0.400}Ca_{0.600}Mn_{1.02}O_{3-\delta}$ | B-site rich (2%) |
| O | $La_{0.400}Ca_{0.600}Mn_{1.04}O_{3-\delta}$ | B-site rich (4%) |
| Q | $La_{0.400}Ca_{0.600}Mn_{1.00}O_{3-\delta}$ | A/B = 1 |
| S | $La_{0.408}Ca_{0.612}Mn_{1.00}O_{3-\delta}$ | A-site rich (2%) |
| T | $La_{0.416}Ca_{0.624}Mn_{1.00}O_{3-\delta}$ | A-site rich (4%) |
| U | $La_{0.400}Ca_{0.600}Mn_{1.11}O_{3-\delta}$ | B-site rich (11%) |
| V | $La_{0.400}Ca_{0.600}Mn_{1.25}O_{3-\delta}$ | B-site rich (25%) |

Figure 4:
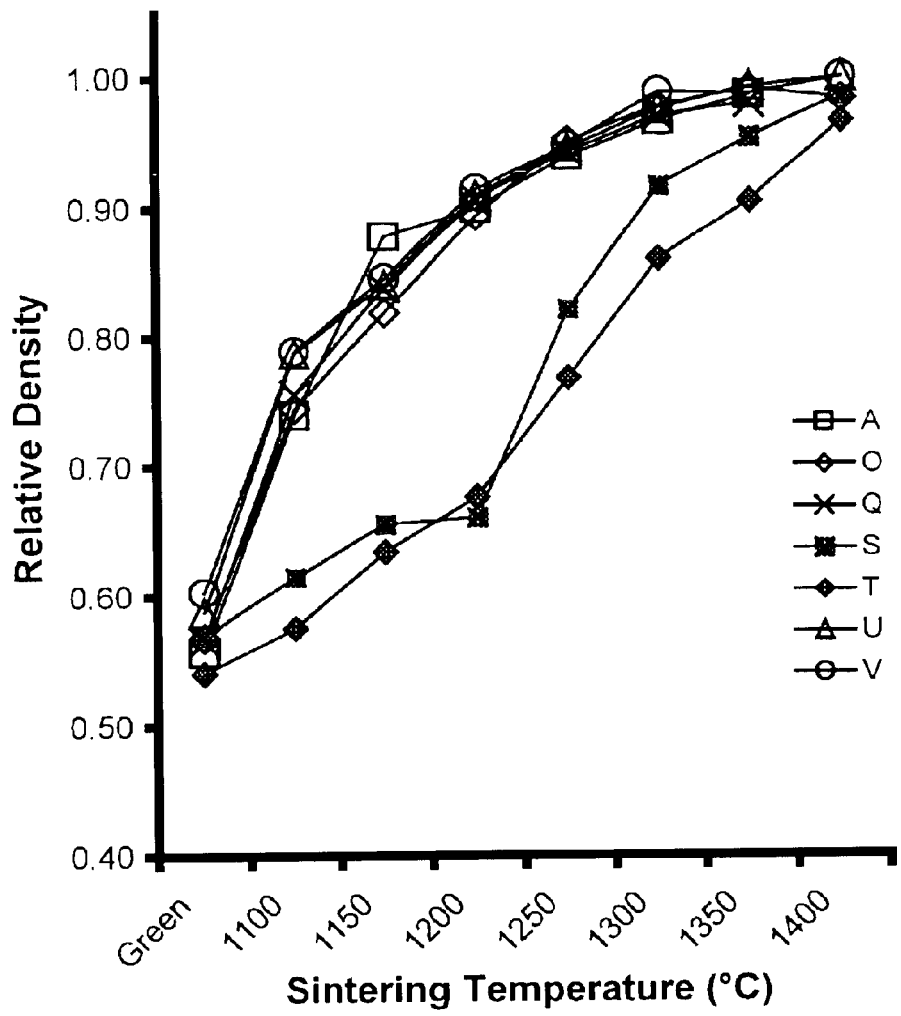
FIG. 4 is a graph showing density of interconnect compositions versus sintering temperature, illustrating the effect of A-site to B-site cation ratio.

FIG. 4 shows the density as a fraction of theoretical density for the compositions shown in Table 2. It is desirable for an interconnect that the density approaches 100% of theoretical at the lowest possible sintering temperature. As shown in FIG. 4, samples A, O, Q, U, and V achieved the highest densities at the lowest temperatures, while samples S and T each required appreciably higher sintering temperatures to reach the same fraction of theoretical density. The common compositional feature of samples A, O, Q, U, and V is that they are B-site rich (higher mole percent of cations on the B-site than the A-site) or stoichiometric (A/B=1), as seen in Table 2. The common compositional feature of samples S, and T, on the other hand is that they are A-site rich (higher mole percent of cations on the A-site than the B-site). It is clear from the data in FIG. 4 that B-site richness is a highly beneficial aspect of these materials in terms of sintering properties. In practical terms, the B-site richness for these LCM materials provided an advantage in sintering temperature of approximately 100° C., which provides tremendous material and process benefits as described above.

EXAMPLE 3

Effect of Substituting Cobalt for Manganese on B-Site

The compositions listed in Table 3 were prepared for evidencing the effect of replacing Manganese on the B-site with other cations whose ionic radius dictates placement on the B-site. The compositions were prepared in exactly the same manner as described in Example 1. Each sample employed a Lanthanum/Calcium ratio of 4:6, and each sample was 2% B-site rich.

TABLE 3

| Sample | Composition | B-Site Content |
| --- | --- | --- |
| A | $La_{0.400}Ca_{0.600}Mn_{1.02}O_{3-\delta}$ | Lanthanum Calcium Manganite (LCM): No B-site dopant |
| H | $La_{0.400}Ca_{0.600}Mn_{0.969}Co_{0.051}O_{3-\delta}$ | LCM with 5% Mn replaced by Co |
| I | $La_{0.400}Ca_{0.600}Mn_{0.765}Co_{0.255}O_{3-\delta}$ | LCM with 25% Mn replaced by Co |
| J | $La_{0.400}Ca_{0.600}Mn_{0.510}Co_{0.510}O_{3-\delta}$ | LCM with 50% Mn replaced by Co |
| L | $La_{0.400}Ca_{0.600}Co_{1.02}O_{3-\delta}$ | Lanthanum Calcium Cobaltite (LCC): 100% of B-site dopant = Co |
| M | $La_{0.400}Sr_{0.030}Ca_{0.570}Mn_{0.996}Co_{0.051}O_{3-\delta}$ | LCM with 5% Ca replaced by Sr and 5% Mn replaced by Co |
| N | $La_{0.400}Sr_{0.150}Ca_{0.450}Mn_{0.765}Co_{0.255}O_{3-\delta}$ | LCM with 25% Ca replaced by Sr and 25% Mn replaced by Co |

Figure 5:
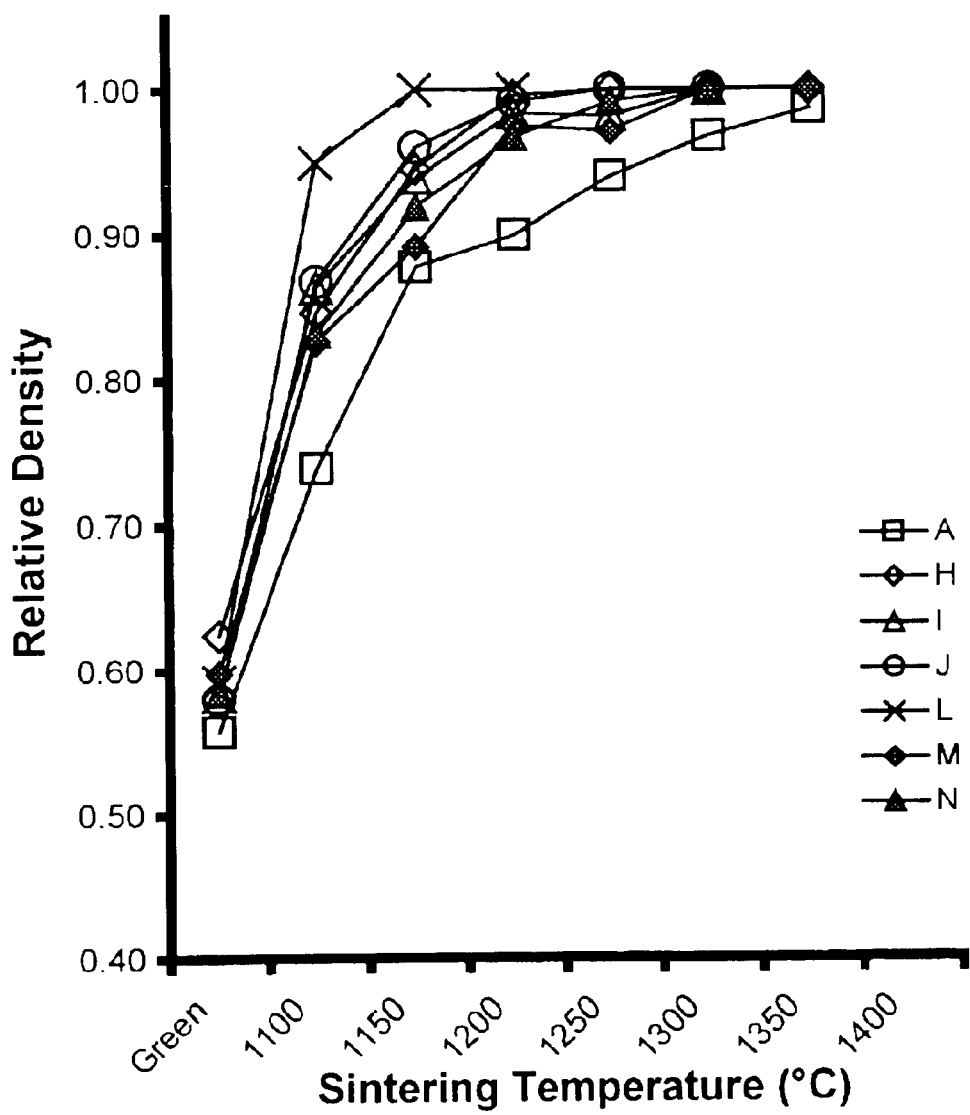
FIG. 5 is a graph showing density of interconnect compositions versus sintering temperature, illustrating the effect of substituting cobalt for manganese on the B-site.

FIG. 5 shows the density as a fraction of theoretical density for the compositions shown in Table 3. Sample A represents a preferred embodiment of the LCM composition. Samples H, I, J, and L represent the same composition as sample A, but with partial replacement of the Manganese on the B-site by Cobalt in the amount of 5%, 25%, 50%,and 100%, respectively. Therefore, sample A represents a Lanthanum Calcium Manganite (LCM) composition, composition L represents a Lanthanum Calcium Cobaltite (LCC) composition, and samples H, I, and J represent intermediate or hybrid compositions.

As shown in FIG. 5, samples H, I, J, and L achieved higher densities at lower temperatures compared with sample A. The substitution of Manganese with Cobalt on the B-site in an LCM-based composition therefore appears to be advantageous for sintering properties. However, the difference is not as significant as the replacement of Ca with Sr (cf. FIG. 3) or B-site richness versus A-site richness (cf. FIG. 4). In addition, Cobalt is a much more mobile cation species than any of the others in these compositional families, which can lead to problems concerning reaction with the setter or contamination of the setter or furnace. The Cobalt content is thus limited to y=0.5 at maximum.

In FIG. 5, samples M and N represent the combined substitution of Ca by Sr on the A-site (hinders sintering) and Mn by Co on the B-site (promotes sintering). In the case of sample M, both substitutions are effected to 5% of the original Ca and Mn content, respectively, while in the case of sample N, both substitutions are effected to 25% of the Ca and Mn content, respectively. In the cases of both sample M and sample N, the sinterability is improved over the base composition (sample A), but is not as sinterable as simple substitution of Mn by Co on the B-site alone. This result demonstrates the superposition of these two competing effects in terms of the sinterability of the composition in multiply doped compositions.

EXAMPLE 4

Deformation Properties

Additional compositions were prepared as in Example 1, in order to determine the degree to which these compositions were subject to permanent plastic deformation as the result of the application of a bending stress. Bars were pressed to achieve a final sintered width of approximately 6 mm. The sintered bars were ground for flatness and to a thickness of approximately 2 mm prior to deformation testing.

Application of bending force to the samples was performed using 4-point bend stress. Load was applied for a specified period (generally 15–20 seconds) and measured with a force gauge to within ~10%. Determination of applied stress ($\sigma$) for both experimental configurations was performed using the standard formula:

$$\sigma = \frac{1.5 \cdot P \cdot S}{t^2 \cdot w}$$

where P is the applied load, S is the total unsupported span, t is the sample thickness, and w is the sample width.

A laser profilometer was used to determine the sample topography as a function of x-y position. This apparatus was capable of determining the absolute height of the flat ground surface of the bar samples to within one ten-thousandth of an inch (2.54 $\mu$m). A typical grid for the profilometer was 50 points by 5 points. For purposes of quantifying the plastic deformation observed for different samples, a parameter representing the degree of deformation about the center point (along the x-axis) was defined, taking into account possible tilt of the sample. This degree of deformation $\xi$ may be defined as:

$$\xi = \frac{z_1 + z_2}{2} - z_{cent}$$

where $z_1$ and $Z_2$ represent the height (z-coordinate) near the ends of the sample, and $Z_{cent}$ denotes the height near the point of flexure. A value of $\xi > 0$ implies that the ends of the sample are higher than the center. For samples in which significant deformation occurred, $Z_{cent}$ was taken near the extremum. This parameterization is necessarily approximate, and differences in $\xi$ of <0.0001 inch are not significant. However, tabulation of $\xi$ provides a useful means of summarizing important trends. The degree of deformation is indicated by the extent to which the $\xi$-parameter changes after the application and release of bending stress compared with the initial value (prior to any stresses). Some of the compositions tested for deformation properties, as well as the associated change in $\xi$-parameter after the application of stress of a $\sigma = 30$ MPa, are listed in Table 4.

TABLE 4

| Composition | Change in Deformation Parameter $\xi$ (0.001") After Application of Stress $\sigma = 30$ Mpa |
|---|---|
| $La_{0.50}Sr_{0.50}Mn_{1.00}Co_{0.04}O_{3-\delta}$ | 3.0 |
| $La_{0.50}Ca_{0.50}Mn_{0.97}Co_{0.05}O_{3-\delta}$ | 0.0 |
| $La_{0.50}Sr_{0.50}Mn_{0.98}Nb_{0.04}O_{3-\delta}$ | 4.0 |
| $La_{0.50}Sr_{0.50}Mn_{0.98}Co_{0.04}O_{3-\delta}$ | 0.6 |
| $La_{0.60}Sr_{0.40}Mn_{0.98}Nb_{0.04}O_{3-\delta}$ | 1.4 |
| $La_{0.60}Sr_{0.40}Mn_{0.98}Co_{0.04}O_{3-\delta}$ | 2.4 |
| $La_{0.70}Sr_{0.30}Mn_{0.96}Nb_{0.04}O_{3-\delta}$ | 0.9 |
| $La_{0.70}Sr_{0.30}Mn_{0.96}Co_{0.04}O_{3-\delta}$ | 1.0 |
| $La_{0.70}Sr_{0.30}Mn_{0.97}Co_{0.05}O_{3-\delta}$ | 1.0 |
| $La_{0.70}Ca_{0.30}Mn_{0.97}Co_{0.05}O_{3-\delta}$ | 0.0 |
| $La_{0.70}Sr_{0.30}Mn_{0.765}Co_{0.255}O_{3-\delta}$ | 0.5 |
| $La_{0.70}Ca_{0.30}Mn_{0.765}Co_{0.255}O_{3-\delta}$ | 0.0 |

Table 4 illustrates the difference in deformation properties between compositions in the LCM and LSM compositional families. The most striking result is than none of the LCM-based compositions across a considerable composition range displayed measurable room temperature deformation, while all LSM-based compositions displayed considerable plastic deformation under moderate bending stress of $\sigma = 30$ MPa. These observations were entirely general, in that deformation was never observed for any LCM-based composition, but deformation was observed for most LSM-based compositions, with the magnitude depending upon specifics of composition and processing.

EXAMPLE 5

Elastic Modulus

A series of bars prepared as in Example 1 was sintered using a similar schedule with a hold temperature of 1400° C. for LSM and 1300° C. for LCM. Approximate measurements of dynamic Young's modulus were obtained using a Grind-O-Sonic apparatus. This method relies on translating the frequency of a standing sound wave in a bar of well-defined geometry to a value for the dynamic Young's modulus. Dynamic Young's modulus data for the samples examined are summarized in Table 5. The composition of samples LSM-1 and LSM-2 was $La_{0.50}Sr_{0.50}Mn_{1.00}Co_{0.04}O_{3-\delta}$, while the composition of samples LCM-1 and LCM-2 was $La_{0.40}Ca_{0.60}Mn_{1.02}O_{3-\delta}$.

TABLE 5

| Sample ID | x (mm) | y (mm) | v (Hz) | Length (mm) | Mass (g) | E (GPa) |
|---|---|---|---|---|---|---|
| LSM-1 | 3.49 | 4.51 | 3.974 | 46.38 | 4.336 | 35 |
| LSM-2 | 3.48 | 4.50 | 3.977 | 46.40 | 4.361 | 36 |
| LCM-1 | 3.77 | 5.12 | 8.752 | 46.13 | 4.679 | 128 |
| LCM-2 | 3.78 | 5.15 | 8.824 | 46.00 | 4.706 | 128 |

The dynamic Young's modulus (E) of the LCM samples represents a greater than three-fold increase compared with the LSM samples, and is much more consistent with a ceramic component being used as the structural element in a solid-state device for separating oxygen from oxygen-containing gaseous mixtures. Furthermore, these results were entirely consistent across a broad composition range, with all LCM-based compositions exhibiting values of dynamic Young's modulus that were significantly greater than all LSM-based compositions. These results provide further evidence of the mechanical superiority of LCM-based compositions over LSM-based compositions.

EXAMPLE 6

Fracture Strength

The same series of bars discussed in Example 5 were studied for the purpose of examining differences in fracture strength between these two compositional families. The compositions of samples LSM-1 and LCM-1 were as given in Example 5. Fracture strength was tested in the four-point bend test as described in Example 4, with increasing stress applied until the bars were fractured.

Strength data for both LSM and LCM bars are summarized in Table 6. N is the number of samples tested, and was sufficiently large to draw statistical conclusions. As shown in Table 6, the characteristic fracture strength ($\delta_{char}$) for the LCM samples was between two and three times greater than that of the LSM samples, and was thus much more consistent with a ceramic component being used as the structural element in a solid-state device for separating oxygen from oxygen-containing gaseous mixtures. Furthermore, these results were entirely consistent across a broad composition range, with all LCM-based compositions exhibiting higher strengths than all LSM-based compositions.

TABLE 6

| Material | N | $\delta_{mean}$ (MPa) | $\delta_{char}$ (MPa) | M (Weibull Modulus) |
|---|---|---|---|---|
| LSM-1 | 23 | 56.9 ± 3.9 | 58.7 | 17.1 |
| LCM-1 | 22 | 145.5 ± 16.2 | 152.9 | 10.5 |

EXAMPLE 7

Conductivity Measurements

Sufficient DC electronic conductivity at the operating temperature is a prerequisite for any viable material for an interconnect in an oxygen-generating stacked solid-state device. Therefore, additional samples were prepared in order to measure electronic conductivity $\sigma_e$ at temperatures between room temperature and 800° C. At each temperature, three measurements were taken, one each at approximate currents of 0.3, 0.6, and 1.0 A. These three conductivity values were averaged to arrive at the reported value for each temperature. In each case, the three values so obtained were very similar (within about 5%). The results of these experiments are shown in Table 7 for the electronic conductivity measured at 800° C.

TABLE 7

| Composition | $\sigma_e$ (S/cm) at 800° C. |
|---|---|
| $La_{0.50}Sr_{0.50}Mn_{1.00}Co_{0.04}O_{3-\square}$ | 289 |
| $La_{0.50}Ca_{0.50}Mn_{1.02}O_{3-\square}$ | 280 |
| $La_{0.40}Ca_{0.60}Mn_{1.02}O_{3-\square}$ | 313 |

At operating temperature, the DC conductivity of the LCM composition was comparable to that of the LSM composition. More precisely, the tested LCM materials showed conductivities of 280–313 S/cm at 800° C. Furthermore, conductivity results were similar throughout the entire realistic operating temperature range of 400° C. to 800° C. From these data it can be concluded that the electrical conductivity of the LCM compositions is suitable for its use as an interconnect in devices for separating oxygen from oxygen-containing gaseous mixtures.

The present invention has been set forth with regard to several preferred embodiments, however, the full scope of the present invention should be ascertained from the following claims.

What is claimed is:

1. An electrochemical solid-state device comprising at least two electrochemical cells which are electrically connected in series by one or more interconnects wherein at least one interconnect consists of a single layer comprising a composition of matter represented by the formula $$Ln_xCa_{x'}A_{x''}Mn_yB_{y'}O_{3-\delta}$$

wherein
Ln is selected from the group consisting of La, Ce, Pr, Nd, Pm, Sm, Eu, Gd, Tb, Dy, Ho, Er, Tm, Yb, and Lu;
A is selected from the group consisting of Sr, Ba and Y;
B is selected from the group consisting of Cu, Co, Cr, Fe, Ni, Zn, Nb, Zr, V, Ta, Ti, Al, Mg, and Ga;
$0.1 \leq x \leq 0.9$; $0.1 \leq x' \leq 0.9$; $0 \leq x'' \leq 0.5$;
$0.5 < y < 1.2$; and $0 \leq y' \leq 0.5$;
provided that $x+x'+x''=1$ and $1.2 > y+y' > 1.0$; and
wherein $\delta$ is a number which renders the composition of matter charge neutral.

2. The electrochemical solid-state device of claim 1 wherein Ln is La, A is Sr, B is Co, $0.3 \leq x \leq 0.5$; $0.5 \leq x' \leq 0.7$; $0 \leq x'' \leq 0.2$; $0.9 < y < 1.05$; and $0 \leq y' \leq 0.1$; provided that $x+x'+x''=1$ and $1.05 > y+y' \leq 1.02$.

3. The electrochemical solid-state device of claim 1 wherein the at least one interconnect consisting of a single aver comprises a composition of matter wherein Ln is La.

4. The electrochemical solid-state device of claim 1 wherein the at least one interconnect consisting of a single layer comprises a composition of matter wherein A is Sr.

5. The electrochemical solid-state device of claim 1 wherein the at least one interconnect consisting of a single layer comprises a composition of matter wherein B is Co.

6. The electrochemical solid-state device of claim 1 wherein the at least one interconnect consisting of a single layer comprises a composition of matter wherein $0.3 \leq x \leq 0.7$ and $0.3 \leq x' \leq 0.7$.

7. The electrochemical solid-state device of claim 1 wherein the at least one interconnect consisting of a single layer comprises a composition of matter wherein x" is 0.

8. The electrochemical solid-state device of claim 1 wherein the at least one interconnect consisting of a single layer comprises a composition of matter wherein $0.9 < y < 1.2$ and $0 \leq y' \leq 0.1$.

9. The electrochemical solid-state device of claim 1 wherein the at least one interconnect consisting of a single layer comprises a composition of matter wherein y' is 0.

10. An electrochemical solid-state device comprising at least two electrochemical cells which are electrically connected in series by one or more interconnects wherein at least one interconnect consists of a single layer comprising a composition of matter represented by the formula:

$$Ln_xCa_{x'}Mn_yO_{3-\delta}$$

wherein
Ln is selected from the group consisting of La, Ce, Pr, Nd, Pm, Sm, Eu, Gd, Tb, Dy, Ho, Er, Tm, Yb, and Lu;
$0.1 \leq x \leq 0.9$; $0.1 \leq x' \leq 0.9$;
$1.0 < y < 1.2$
provided that $x+x'=1$; and
wherein $\delta$ is a number which renders the composition of matter charge neutral.

11. The electrochemical solid-state device of claim 10 wherein the at least one interconnect consisting of a single layer comprises a composition of matter wherein $0.3 \leq x \leq 0.7$.

12. The electrochemical solid-state device of claim 10 wherein Ln is La, $0.3 \leq x \leq 0.5$ and $1.0 < y < 1.05$.

13. An interconnect for an electrically driven solid electrolyte oxygen separation device comprising a composition of matter represented by the general formula:

$$Ln_xCa_{x'}A_{x''}Mn_yB_{y'}O_{3-\delta}$$

wherein

Ln is La;

A is Sr;

B is Co;

$0.3 < x < 0.5$; $0.5 < x' < 0.7$; $0 < x'' < 0.2$;

$0.9 < y < 1.05$; and $0 < y' < 0.1$;

provided that $x + x' + x'' = 1$ and $1.05 > y + y' \geq 1.02$;

wherein $\delta$ is a number which renders the composition of matter charge neutral.

* * * * *

UNITED STATES PATENT AND TRADEMARK OFFICE
CERTIFICATE OF CORRECTION

PATENT NO. : 6,811,914 B2
DATED : November 2, 2004
INVENTOR(S) : Donald Laurence Meixner It is certified that error appears in the above-identified patent and that said Letters Patent is hereby corrected as shown below:

Column 14,
Line 24, delete "< 1.02." and substitute therefore -- > 1.02. --
Line 27, delete the word "aver" and substitute therefore -- layer --.

Signed and Sealed this

Twenty-second Day of March, 2005

JON W. DUDAS
*Director of the United States Patent and Trademark Office*